US011239786B2

(12) United States Patent
Murata et al.

(10) Patent No.: US 11,239,786 B2
(45) Date of Patent: Feb. 1, 2022

(54) MOTOR CONTROL DEVICE

(71) Applicants: Hiromi Murata, Aichi (JP); Jiro Matsukawa, Aichi (JP); Tomoya Yamanaka, Aichi (JP); Masamitsu Hamasaki, Aichi (JP); Naoyuki Ito, Aichi (JP); Keita Gunji, Aichi (JP)

(72) Inventors: Hiromi Murata, Aichi (JP); Jiro Matsukawa, Aichi (JP); Tomoya Yamanaka, Aichi (JP); Masamitsu Hamasaki, Aichi (JP); Naoyuki Ito, Aichi (JP); Keita Gunji, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 0 days.

(21) Appl. No.: 16/746,129

(22) Filed: Jan. 17, 2020

(65) Prior Publication Data
US 2020/0235692 A1    Jul. 23, 2020

(30) Foreign Application Priority Data

Jan. 17, 2019 (JP) .............................. JP2019-006140

(51) Int. Cl.
*H02P 27/08* (2006.01)
*H02M 1/088* (2006.01)
*H02M 7/5387* (2007.01)

(52) U.S. Cl.
CPC ............ *H02P 27/08* (2013.01); *H02M 1/088* (2013.01); *H02M 7/5387* (2013.01)

(58) Field of Classification Search
CPC ..... H02P 27/08; H02M 1/088; H02M 7/5387; H02M 7/003
See application file for complete search history.

(56) References Cited

U.S. PATENT DOCUMENTS

| 10,106,189 | B2 * | 10/2018 | Iwabuki | ..................... H02P 6/10 |
| 2013/0119908 | A1 * | 5/2013 | Harada | ................... H05K 7/026 |
| | | | | 318/400.42 |

FOREIGN PATENT DOCUMENTS

| JP | H06-270824 A | 9/1994 |
| JP | H11-069869 A | 3/1999 |
| JP | 2013-103535 A | 5/2013 |

* cited by examiner

*Primary Examiner* — Muhammad S Islam
*Assistant Examiner* — Devon A Joseph
(74) *Attorney, Agent, or Firm* — Osha Bergman Watanabe & Burton LLP

(57) ABSTRACT

Provided is a motor control device that includes a controller outputting a PWM control signal for controlling a multiphase electric motor, a driving signal generator generating a switching element driving signal for driving the multiphase electric motor according to the PWM control signal output from the controller, and a bridge circuit configured of a plurality of semiconductor switching elements switching a current flowing through the multiphase electric motor according to the switching element driving signal generated by the driving signal generator. The controller is provided on a first board. The driving signal generator and the bridge circuit are provided on a second board and are connected by wiring provided on the second board. The first board and the second board are connected by a predetermined inter-board connecting line. The controller outputs the PWM control signal to the driving signal generator through the predetermined inter-board connecting line.

9 Claims, 3 Drawing Sheets

MOTOR CONTROL DEVICE

CROSS-REFERENCE TO RELATED APPLICATION

This application is based on Japanese Patent Application No. 2019-006140 filed with the Japan Patent Office on Jan. 17, 2019, the entire contents of which are incorporated herein by reference.

FIELD

The present invention relates to a motor control device, and particularly to a motor control device that controls a multiphase electric motor.

BACKGROUND

Conventionally, a technique related to a motor control device that uses a multiphase electric motor to control electric power steering is known. For example, JP 2013-103535 A discloses an electronic control unit for electric power steering capable of further reducing the size and improving the reliability of the electronic control unit while obtaining a degree of freedom in wiring design. This electronic control unit for electric power steering includes a control board on which control surface mounting components such as a CPU and a drive circuit are mounted, and a power board on which power surface mounting components such as a three-phase bridge circuit configured of an FET with a higher allowable current capacity than that of the control surface mounting component is mounted. The control board and the power board configure a laminated board mounting structure. Six terminals for connecting output of the drive circuit and six FETs of the three-phase bridge circuit, or the like connect the control board and the power board.

JP 06-270824 A discloses an electric power steering circuit device that achieves downsizing and cost reduction. This electric power steering circuit device includes a metal board having a wiring pattern joined and arranged through an insulating layer, the metal board configured to mount a shunt resistor and a bridge circuit on the wiring pattern, a first insulating printed circuit board on which a microcomputer is mounted, and a second insulating printed circuit board on which a peripheral circuit element such as an IC chip is mounted. The first insulating printed circuit board and the second insulating printed circuit board are connected through a conductive wire. The second insulating printed circuit board and the metal board are connected through a conductive wire. In addition, this electric power steering circuit device may be configured of two boards, that is, a first insulating printed circuit board and a metal board, by mounting a driving circuit on the metal board. In this case, the first insulating printed board and the metal board are connected through a conductive wire.

JP 11-069869 A discloses an electric motor control device that outputs only an excitation pattern for smoothly rotating an electric motor. In this electric motor control device, in order to control six switching elements that constitute a bridge circuit, a main CPU gives to a driver driving and monitoring IC, driving signals through six signal lines as many as the switching elements. Further, the main CPU also gives a PWM signal for PWM-driving the switching element to be controlled through a signal line.

In a control device that uses a multiphase electric motor to control electric power steering, a control-system board and a board on which a bridge circuit for driving the multiphase electric motor is mounted may be separated due to dimensional restrictions and heat dissipation properties of the control device. In that case, the number of terminals for connecting the control-system board and the board on which the bridge circuit increases or decreases depending on which board a driving IC for driving the bridge circuit is mounted. The number of signal lines from the control-system board to the driving IC needs to be at least the same as the number of switching elements in the bridge circuit. The number of signal lines from the driving IC to the bridge circuit needs to be at least twice the number of switching elements.

SUMMARY

The present invention has been devised in view of such circumstances, and provides a motor control device that reduces the number of terminals for connecting a control-system board and a board on which a bridge circuit is mounted and that can be easily manufactured, resulting in cost reduction.

In order to solve the above problems, a motor control device controlling a multiphase electric motor is provided. The motor control device includes a controller configured to output a PWM control signal for controlling the multiphase electric motor, a driving signal generator configured to generate a switching element driving signal for driving the multiphase electric motor according to the PWM control signal output from the controller, and a bridge circuit configured of a plurality of semiconductor switching elements configured to switch a current flowing through the multiphase electric motor, according to the switching element driving signal generated by the driving signal generator. The controller is provided on a first board. The driving signal generator and the bridge circuit are provided on a second board and are connected by wiring provided on the second board. The first board and the second board are connected by a predetermined inter-board connecting line. The controller outputs the PWM control signal to the driving signal generator through the predetermined inter-board connecting line.

According to this, the controller is provided on the first board, the bridge circuit and a driver IC including the driving signal generator configured to drive the bridge circuit are provided on the second board different from the first board, and the first board and the second board are connected by the predetermined inter-board connecting line. Therefore, it is possible to provide the motor control device that reduces the number of terminals for connecting a control-system board and a board on which the bridge circuit is mounted and that can be easily manufactured, resulting in cost reduction.

Furthermore, the controller may output a PWM control signal for each of the plurality of semiconductor switching elements, and the predetermined inter-board connecting line may have a signal line corresponding to each of the plurality of semiconductor switching elements.

According to this, since the inter-board connecting line includes the signal line corresponding to each of the plurality of switching elements, it is possible to reduce the number of terminals that connects the control-system board and the board on which the bridge circuit is mounted and to reduce costs.

Furthermore, the PWM control signal output from the controller may be a PWM duty value of each phase of the multiphase electric motor, and the predetermined inter-board connecting line may be a serial communication bus.

According to this, the controller outputs the PWM duty value of each phase of the multiphase electric motor, and the inter-board connecting line is the serial communication bus. Therefore, it is possible to reduce the number of terminals that connect the control-system board and the board on which the bridge circuit is mounted, and to reduce costs.

The motor control device may further include a shunt resistor provided on a low potential side of the bridge circuit, the shunt resistor configured to measure a current flowing through each phase of the bridge circuit, and a current detector configured to detect a current according to a detection value detected by the shunt resistor. The current detector may include a shunt resistor connecting terminal provided for each shunt resistor and connected to at least the high potential side of the shunt resistor, and the current detector may be configured to output a current detection value corresponding to a voltage obtained from the shunt resistor connecting terminal to the predetermined inter-board connecting line. The controller may receive the current detection value of each phase of the bridge circuit through the predetermined inter-board connecting line.

According to this, the controller receives the current detection value of each phase of the multiphase electric motor as feedback through the predetermined inter-board connecting line. Therefore, it is possible to perform appropriate driving control without increasing the number of terminals that connect the control-system board and the board on which the bridge circuit is mounted.

As described, according to the present invention, it is possible to provide the motor control device that reduces the number of terminals that connect the control system board and the board on which the bridge circuit is mounted and that can be easily manufactured, resulting in cost reduction.

DETAILED DESCRIPTION

Figure 3:
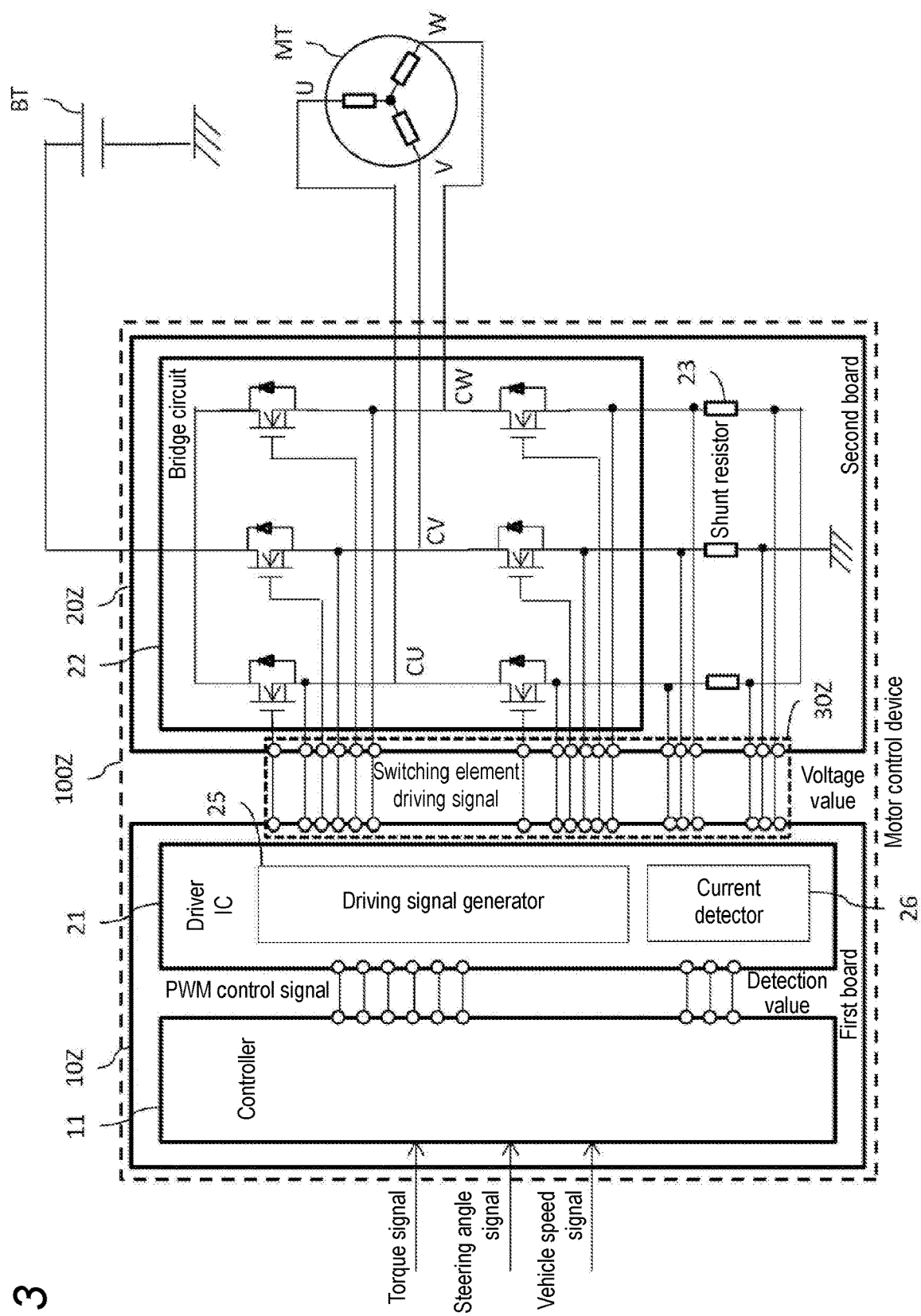
FIG. 3 is a block configuration diagram of a motor control device in a conventional art.

Hereinafter, embodiments according to the present invention will be described with reference to the drawings. First, a motor control device 100Z in a conventional art will be described with reference to FIG. 3.

The motor control device 100Z controls a three-phase electric motor MT used for electric power steering mounted on a vehicle. The motor control device 100Z includes a first board 10Z, a second board 20Z, and an inter-board connecting line 30Z that electrically connects the first board 10Z and the second board 20Z. A plurality of mounting components including electronic mounting components to be described later, are mounted on each of the first board 10Z and the second board 20Z. The first board 10Z and the second board 20Z are electrically connected to each other by printed wiring or the like provided on each of the first board 10Z and the second board 20Z.

The motor control device 100Z includes, on the first board 10Z, a controller 11 that outputs a PWM control signal for driving and controlling the three-phase electric motor MT, and a driver IC 21 that generates a switching element driving signal from the PWM control signal output from the controller 11. The motor control device 100Z further includes, on the second board 20Z, a bridge circuit 22 that is controlled according to the switching element driving signal generated by the driver IC 21 and drives the three-phase electric motor MT, and shunt resistors 23 provided on the low potential side of the bridge circuit 22 and configured to measure a current flowing through phase circuits CU/CV/CW of the respective phases of the bridge circuit 22. The driver IC 21 includes a driving signal generator 25 that generates a switching element driving signal for controlling the bridge circuit 22 according to the PWM control signal output from the controller 11, and a current detector 26 that detects the current from the detection value measured by the shunt resistor 23. Note that the detection value measured by the shunt resistor 23 is a value of a voltage drop caused by a current flowing through the shunt resistor 23.

The bridge circuit 22 has the three phase circuits CU/CV/CW for driving the three-phase electric motor MT. One side of each of the three phase circuits CU/CV/CW is connected to the positive electrode of a battery BT. The other side each of the three phase circuits CU/CV/CW is connected to the ground (grounded) via the shunt resistor 23. Each of the phase circuits CU/CV/CW has a high potential-side switching element and a low potential-side switching element. The bridge circuit 22 has a total of six switching elements. The source of the high potential-side switching element is connected to the drain of the low potential-side switching element. The source of the low potential-side switching element is connected to the ground through the shunt resistor 23. Connection points between the high potential-side switching elements and the low potential-side switching elements in the phase circuits CU/CV/CW are connected to the phases U/V/W of the three-phase electric motor MT, respectively.

In order to drive and control each of the high potential-side switching elements and the low potential-side switching elements, the driver IC 21 is connected to the gate and the source, and a switching element driving signal generated by the driving signal generator 25 is input to the gate. As a result, the source and the drain of each of the high potential-side switching elements and the low potential-side switching elements is electrically connected or disconnected. Note that the voltage of the switching element driving signal input to the gate is set to be higher by at least a gate threshold voltage than the source voltage. Then, in order to connect the driver IC 21 and the bridge circuit 22, the inter-board connecting line 30Z configured of at least 12 signal lines is required.

In addition, in order for the controller 11 to appropriately drive and control the three-phase electric motor MT, it is necessary to feed back the current flowing through each of the phase circuits CU/CV/CW to the controller 11. Therefore, the connection point between the low potential-side switching element in each of the phase circuits CU/CV/CW and the shunt resistor 23 is connected to the inter-board connecting line 30Z, and the connection point on the low potential side of the shunt resistor 23 is connected to the inter-board connecting line 30Z. As described, by measuring the voltage value across the shunt resistor 23 and transmitting the voltage value to the current detector 26 provided in n in the driver IC 21 and having an amplification function, it is possible to transmit the current detection value of each of the phase circuits CU/CV/CW to the controller 11. Then, in order to transmit the current detection value obtained from the voltage value across the shunt resistor 23 to the first board 10Z, the inter-board connecting line 30Z configured of at least six signal lines is required.

As described above, if the controller 11 and the driver IC 21 are provided on the first board 10Z and the bridge circuit 22 and the shunt resistors 23 are provided on the second board 20Z, the inter-board connecting line 30Z configured of the twelve signal lines for driving and controlling the bridge circuit 22 and the six signal lines for feeding back the current detection value, that is, a total of 18 signal lines, are required. As described, in the motor control device 100Z in a conventional art, the first board 10Z on which the control-system circuit is mounted and the second board 20Z on which the bridge circuit 22 is mounted are physically separated. Therefore, the number of signal lines constituting the inter-board connecting line 30Z is increased, which takes time and labor for manufacturing and causes an increase in cost. Motor control devices in the following embodiments solve these problems.

FIRST EMBODIMENT

Figure 1:
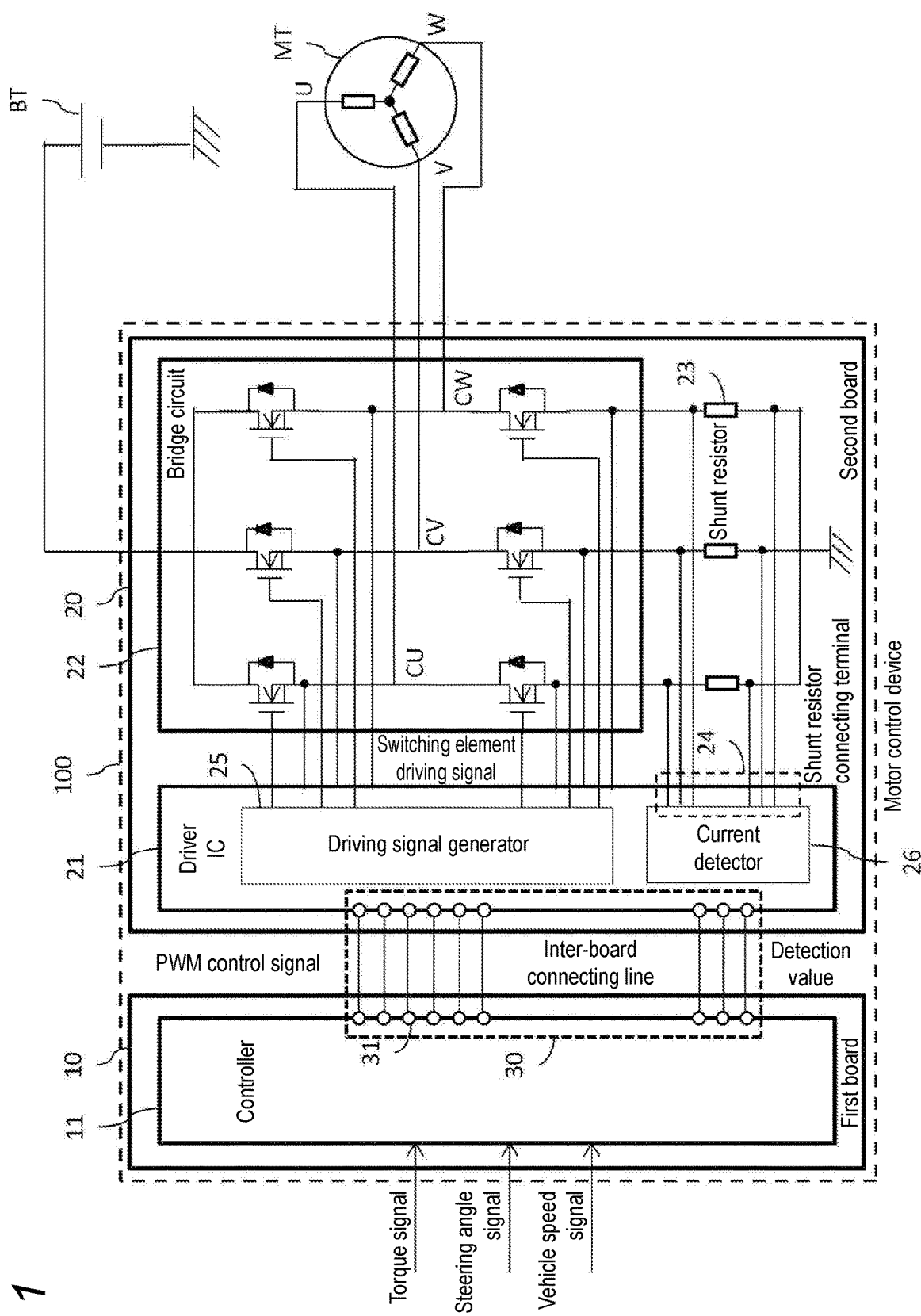
FIG. 1 is a block configuration diagram of a motor control device according to a first embodiment of the present invention.

With reference to FIG. 1, a motor control device 100 in an embodiment will be described. The motor control device 100 controls a three-phase electric motor MT used for electric power steering mounted on a vehicle. The motor control device 100 includes a first board 10, a second board 20, and an inter-board connecting line 30 that electrically connects the first board 10 and the second board 20. A plurality of mounting components including electronic mounting components to be described later, are mounted on each of the first board 10 and the second board 20. The first board 10 and the second board 20 are electrically connected to each other by printed wiring or the like provided on each of the first board 10 and the second board 20.

The motor control device 100 includes, on the first board 10, a controller 11 that outputs a pulse width modulation (PWM) control signal for controlling the three-phase electric motor MT. The motor control device 100 includes, on the second board 20, a driver IC 21 that generates a switching element driving signal from the PWM control signal output from the controller 11, a bridge circuit 22 that is controlled according to the switching element driving signal generated by the driver IC 21 and drives the three-phase electric motor MT, and shunt resistors 23 provided on a low potential side of the bridge circuit 22 and configured to measure a current flowing through each of phase circuits CU/CV/CW of respective phases of the bridge circuit 22. The driver IC 21 includes a driving signal generator 25 that generates a switching element driving signal for controlling the bridge circuit 22 according to the PWM control signal output from the controller 11, and a current detector 26 that detects the current from the detection value detected by the shunt resistor 23.

The controller 11 outputs a PWM control signal for driving and controlling the bridge circuit 22 to the driving signal generator 25 in the driver IC 21 through an inter-board connecting line 30. The controller 11 receives, as input information, a detection value of a current flowing through each of the phase circuits CU/CV/CW, fed back from the shunt resistor 23, a torque signal indicating a steering torque value of steering obtained from another sensor or an electric control unit (ECU), not illustrated, a steering angle signal indicating a steering angle, and a vehicle speed. Note that the controller 11 is configured of a microcomputer including a CPU and a memory.

According to the input information, the controller 11 calculates a command voltage for each phase corresponding to assist force that the three-phase electric motor MT should apply to the steering, and outputs a PWM control signal having a waveform for controlling a semiconductor switching element of each phase (hereinafter simply referred to as a switching element) in the bridge circuit 22 so as to correspond to the command voltage. The controller 11 outputs a signal corresponding to a signal input to the gate of each switching element in the bridge circuit 22 to the driving signal generator 25 through the inter-board connecting line 30. That is, the controller 11 outputs a PWM control signal for each switching element. Then, the bridge circuit 22 included in the motor control device 100 includes six switching elements as in the bridge circuit 22 in the conventional art. Therefore, the inter-board connecting line 30 that connects the controller 11 on the first board 10 and the driver IC 21 on the second board 20 has signal lines corresponding to the respective switching elements, and is configured of at least six signal lines 31.

As described, the controller 11 is provided on the first board 10, the bridge circuit 22 and the driver IC 21 including the driving signal generator 25 configured to drive the bridge circuit 22 are provided on the second board 20 different from the first board 10, the driving signal generator 25 and the bridge circuit 22 are connected to each other by printed wiring provided on the same board, and the first board 10 and the second board 20 are connected by the predetermined inter-board connecting line 30. Therefore, it is possible to provide a motor control device that uses fewer terminals that connect the control-system board and the board on which the bridge circuit is mounted and can be more easily manufactured with less costs than the motor control device 100Z in the conventional art. In addition, since the inter-board connecting line 30 includes the signal lines 31 corresponding to the switching elements, respectively, it is possible to reduce the number of terminals that connect the control-system board and the board on which the bridge circuit is mounted and to reduce costs.

The driver IC 21 receives a PWM control signal that is a signal corresponding to a signal input from the signal line 31 of the inter-board connecting line 30 to the gate of the switching element. The driving signal generator 25 in the driver IC 21 outputs to the bridge circuit 22 a switching element driving signal adjusted to a voltage level that can be actually applied to the gate of the switching element.

The bridge circuit 22 is configured of a plurality of switching elements that switches the current flowing through the three-phase electric motor MT according to a switching element driving signal generated by the driving signal generator 25. Note that in the embodiment, a MOSFET, that is, a metal-oxide-semiconductor field-effect transistor, is used as each of the high potential-side switching element and the low potential-side switching element. When the bridge circuit 22 receives a switching element driving signal, the bridge circuit 22 drives and controls the three-phase electric motor MT according to the switching element driving signal, and gives assist force to the steering. The shunt resistor 23 is provided on the low potential side of the bridge circuit 22 in order to feed back a current flowing through each of the phase circuits CU/CV/CW of the bridge circuit 22.

The driver IC 21 has a shunt resistor connecting terminal 24 connected to both the high potential side and the low potential side of the shunt resistor 23 through printed wiring provided on the second board 20. The shunt resistor connecting terminal 24 is connected to a current detector 26 in the driver IC 21. When the current detector 26 obtains the voltage value across the shunt resistor 23 of each of the phase circuits CU/CV/CW, the current detector 26 amplifies the voltage value and outputs the obtained value as a current detection value to the inter-board connecting line 30. The controller 11 receives the current detection value of each of the phase circuits CU/CV/CW of the bridge circuit 22 through the inter-board connecting line 30. The inter-board connecting line 30 has three signal lines 31 in order for the current detector 26 to transmit the current detection values of the three phase circuits CU/CV/CW.

As described, the controller 11 receives the current detection values of the respective phase circuits CU/CV/CW of the multiphase electric motor MT as feedback through the predetermined inter-board connecting line 30. Therefore, it is possible to perform appropriate drive control without increasing the number of terminals that connect the control-system board and the board on which the bridge circuit is mounted.

SECOND EMBODIMENT

Figure 2:
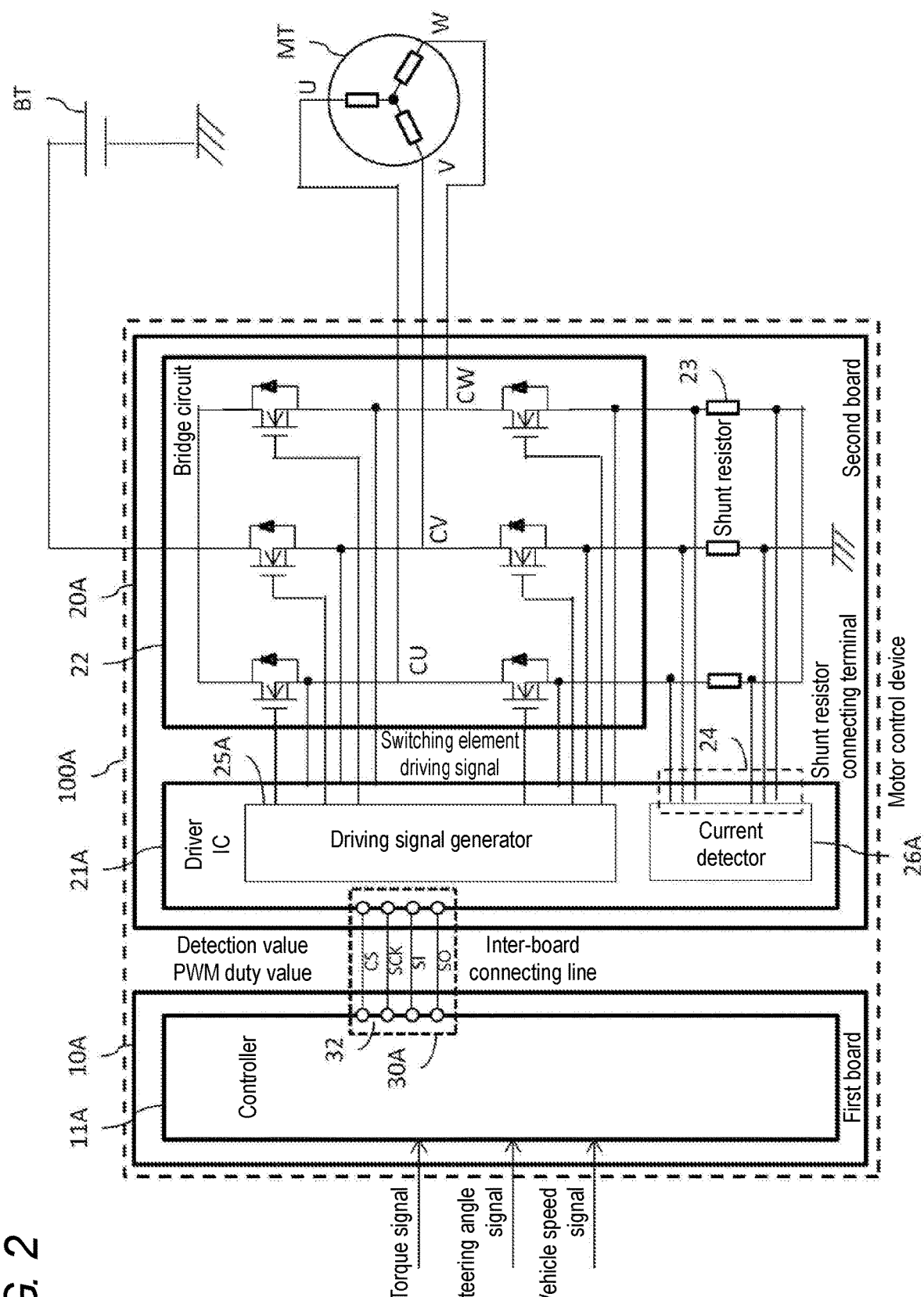
FIG. 2 is a block configuration diagram of a motor control device according to a second embodiment of the present invention.

With reference to FIG. 2, a motor control device 100A in an embodiment will be described. Note that in order to avoid overlapping description, identical reference signs denote identical constituents, and points of difference will be mainly described. The motor control device 100A controls a three-phase electric motor MT used for electric power steering mounted on a vehicle. The motor control device 100A includes a first board 10A, a second board 20A, and an inter-board connecting line 30A that connects the first board 10A and the second board 20A.

The motor control device 100A includes, on the first board 10A, a controller 11A that outputs a PWM duty value for controlling the three-phase electric motor MT. The motor control device 100A includes, on the second board 20A, a driver IC 21A that generates a switching element driving signal from the PWM duty value output from the controller 11A, a bridge circuit 22 that is controlled by the switching element driving signal generated by the driver IC 21A and drives the three-phase electric motor MT, and shunt resistors 23 provided on a low potential side of the bridge circuit 22 and configured to measure a current flowing through each of phase circuits CU/CV/CW of respective phases of the bridge circuit 22. The driver IC 21A includes a driving signal generator 25A that generates a switching element driving signal for controlling the bridge circuit 22 according to the PWM duty value output from the controller 11A, and a current detector 26A that detects the current from the detection value detected by the shunt resistor 23. Note that the current detector 26A has a function of amplifying the detection value and an AD conversion function.

The controller 11A outputs a PWM duty value for driving and controlling the bridge circuit 22 to the driving signal generator 25A in the driver IC 21A through the inter-board connecting line 30A. The controller 11A receives, as input information, a detection value of a current flowing through each of the phase circuits CU/CV/CW, fed back from the shunt resistor 23, a torque signal indicating a steering torque value of steering obtained from another sensor or an electric control unit (ECU), not illustrated, a steering angle signal indicating a steering angle, and a vehicle speed.

According to the input information, the controller 11A calculates a command voltage for each phase corresponding to the assist force that the three-phase electric motor MT should apply to the steering, and outputs the PWM duty value of each phase for controlling the switching element in the bridge circuit 22 according to the command value. For example, in the case of indicating 256 steps of PWM duty values, the controller 11A outputs a 1-byte (8-bit) data signal indicating a PWM duty value to the driving signal generator 25A through the inter-board connecting line 30A.

The inter-board connecting line 30A sequentially transmits a data signal indicating the PWM duty value output from the controller 11A on the first board 10A to the driver IC 21A provided on the second board 20A bit by bit. The inter-board connecting line 30A is typically configured of a serial communication bus. The inter-board connecting line 30A illustrated in FIG. 2 is an example of a serial peripheral interface (SPI) communication, and is a full-duplex serial communication bus configured of four lines, that is, a chip select (CS) line, a serial clock (SCK) line, a slave in (SI) line, and a slave out (SO) line. Of course, the serial communication bus adopted as the inter-board connecting line 30A is not limited to this, and may be a half-duplex serial communication bus. In this case, the serial communication bus may be configured of three lines. In the standard without a chip select, the serial communication bus may be configured of two lines. The serial communication system is not limited to SPI, and may be a system such as I2C, or CAN, LIN, or Flexray for in-vehicle communication LAN. As described, in the case of using a serial communication bus for the inter-board connecting line 30A, it is not necessary to provide a signal line corresponding to each switching element as in the above-described embodiment. Therefore, it is possible to further reduce the number of terminals that connect the control-system board and the board on which the bridge circuit is mounted, and to reduce costs.

The driver IC 21A has a serial communication function and receives a PWM control signal indicating a PWM duty value from the inter-board connecting line 30A. The driving signal generator 25A in the driver IC 21A generates a switching element driving signal from a predetermined voltage and a triangular wave corresponding to the PWM duty value, and outputs the switching element driving signal to the bridge circuit 22. When the bridge circuit 22 receives a switching element driving signal, the bridge circuit 22 drives and controls the three-phase electric motor MT according to the switching element driving signal, and gives assist force to the steering. The shunt resistor 23 is provided on the low potential side of the bridge circuit 22 in order to feed back a current flowing through each of the phase circuits CU/CV/CW of the bridge circuit 22.

The driver IC 21A includes a shunt resistor connecting terminal 24 connected to both the high potential side and the low potential side of the shunt resistor 23 provided for feeding back the value of the current flowing through each of the phase circuits, through printed wiring provided on the second board 20A. The shunt resistor connecting terminal 24 is connected to a current detector 26A in the driver IC 21A. When the current detector 26A obtains the voltage value across the shunt resistor 23 of each of the phase circuits CU/CV/CW, the current detector 26A outputs current detection value data obtained by amplifying the voltage value and converting the amplified analog voltage value into a digital value, to the inter-board connecting line 30A. More specifically, the inter-board connecting line 30A sequentially transfers current detection value data indicating the current value of each phase output from the current detector 26A in the driver IC 21A on the second board 20A to the controller 11A on the first board 10A bit by bit.

As described, in a case where a serial communication bus is used as the inter-board connecting line 30A, it is not necessary to provide signal lines corresponding to the respective phase circuits CU/CV/CW in order to feed back the current value to the control system as in the above-described embodiment. By sharing the serial communication bus that transfers a PWM duty value from the first board 10A to the second board 20A, it is possible to further reduce the number of terminals that connect the control-system board and the board on which the bridge circuit is mounted and to reduce costs.

Note that the present invention is not limited to the illustrated embodiments, and can be executed by the structure of the range not deviating from the content described in each item of the claims. That is, although the present invention has been particularly illustrated and described with respect to particular embodiments, it should be understood that those skilled in the art can make various modifications to the above-described embodiments in terms of quantity and another detailed configuration without departing from the scope of the technical idea and the purpose of the present invention.

The invention claimed is:

1. A motor control device controlling a multiphase electric motor, the motor control device comprising:
   a first board comprising:
      a controller configured to output a pulse width modulation control (PWM) signal for controlling the multiphase electric motor;
   a second board comprising:
      a driving signal generator configured to generate a switching element driving signal for driving the multiphase electric motor, according to the PWM control signal output from the controller; and
      a bridge circuit comprising a plurality of semiconductor switching elements which are configured to switch a current flowing through the multiphase electric motor, according to the switching element driving signal,
      wherein the driving signal generator and the bridge circuit are connected via a plurality of signal lines; and
   a serial communication bus configured to connect the first board and the second board,
      wherein the controller transmits the PWM control signal to the driving signal generator through the serial communication bus.

2. The motor control device according to claim 1, wherein the PWM control signal output from the controller is a PWM duty value of each phase of the multiphase electric motor.

3. The motor control device according to claim 1, wherein a number of lines of the serial communication bus is lower than a number of the plurality of signal lines.

4. The motor control device according to claim 1, wherein the controller sequentially transmits the PWM control signal to the driving signal generator through the serial communication bus.

5. The motor control device according to claim 1, wherein the serial communication bus transmits signals for an in-vehicle communication local area network (LAN) via a system comprising at least one of a serial peripheral interface (SPI), an inter-integrated circuit (I2C), a controller area network (CAN), a local interconnect network (LIN), or a Flexray.

6. The motor control device according to claim 1, wherein
   the serial communication bus transmits signals via a system comprising an SPI, and
   the serial communication bus is a full-duplex serial communication bus having four lines comprising a CS line, a serial clock (SCK) line, a slave in (SI) line, and a slave out (SO) line.

7. The motor control device according to claim 1 further comprising:
   a shunt resistor provided on a low potential side of the bridge circuit, the shunt resistor configured to measure a current flowing through each phase of the bridge circuit; and
   a current detector configured to detect a current according to a detection value detected by the shunt resistor,
   wherein the shunt resistor and the current detector are provided on the second board, and
   wherein the current detector includes a shunt resistor connecting terminal provided for each shunt resistor and connected to at least a high potential side of the shunt resistor, the current detector configured to output a current detection value to the controller through the serial communication bus, where the current detection value corresponds to a voltage obtained from the shunt resistor connecting terminal.

8. The motor control device according to claim 1, wherein the plurality of signal lines comprises:
   a plurality of first signal lines for connecting the driving signal generator and a plurality of gates of respective semiconductor switching elements; and
   a plurality of second signal lines for connecting the driving signal generator and a plurality of sources of the respective semiconductor switching elements.

9. The motor control device according to claim 8, wherein a voltage of a driving signal input to the plurality of gates is set to be higher than a source voltage by at least a gate threshold voltage.

* * * * *